United States Patent [19]
Kiel et al.

[11] Patent Number: 6,128,072
[45] Date of Patent: Oct. 3, 2000

[54] OPTICAL FLOW METER INTEGRALLY MOUNTED TO A RIGID PLATE WITH DIRECT OPTICAL ACCESS TO THE INTERIOR OF A PIPE

[75] Inventors: Darwin Edward Kiel, New Westminster; Ian David Williamson, Calgary, both of Canada

[73] Assignee: NOVA Gas Transmission Ltd., Calgary, Canada

[21] Appl. No.: 09/065,364

[22] Filed: Apr. 23, 1998

[51] Int. Cl.$^7$ ................................. G01P 3/36; G01F 1/00
[52] U.S. Cl. ................................. 356/28; 73/861; 356/28.5
[58] Field of Search ........................ 356/28, 28.5; 73/861

[56] References Cited

U.S. PATENT DOCUMENTS

| | | | |
|---|---|---|---|
| 4,125,778 | 11/1978 | Smart | 250/574 |
| 4,201,467 | 5/1980 | Hartmann et al. | 356/28 |
| 4,251,733 | 2/1981 | Hirleman, Jr. | 250/575 |
| 4,664,513 | 5/1987 | Webb et al. | 356/28 |
| 4,707,130 | 11/1987 | Hofmann et al. | 356/28 |
| 4,804,263 | 2/1989 | School | 356/28 |
| 4,851,697 | 7/1989 | School | 356/28 |
| 4,887,213 | 12/1989 | Smart et al. | 364/424.01 |
| 4,978,863 | 12/1990 | Lyons et al. | 250/574 |
| 4,989,969 | 2/1991 | Siebert et al. | 356/28 |
| 5,000,566 | 3/1991 | Kuppenheimer, Jr. et al. | 356/28 |
| 5,046,840 | 9/1991 | Abbiss et al. | 356/28 |
| 5,131,741 | 7/1992 | Zweben | 356/28 |
| 5,148,229 | 9/1992 | Wiseall | 356/28 |
| 5,313,263 | 5/1994 | Abbiss et al. | 356/28.5 |
| 5,365,326 | 11/1994 | Chrisman et al. | 356/28.5 |
| 5,701,172 | 12/1997 | Azzazy | 356/28 |
| 5,751,410 | 5/1998 | Roehle et al. | 356/28 |
| 5,865,871 | 2/1999 | Simundich | 73/861 |

FOREIGN PATENT DOCUMENTS

| | | |
|---|---|---|
| 9-304535 | 11/1997 | Japan . |
| 2116699 | 9/1983 | United Kingdom . |
| 0302431 | 2/1989 | United Kingdom . |
| 2295670 | 6/1996 | United Kingdom . |
| 2295670 | 8/1998 | United Kingdom . |

OTHER PUBLICATIONS

Experimental Methods for Engineers, Fourth Edition, pp. 230–283, J. P. Holman & W. J. Gaida, Chapter 7, "Flow Measurement", McGraw–Hill.

"A tracer–particle fluid velocity Meter Incorporating a laser", Journal of Scientific Instruments, 1968, Series 2, vol. 1, D. H. Thompson, pp. 929–932.

"A Laser–Two–Focus (L2F) Velocimeter for Automatic Flow Vector Measurements in the Rotating Components of Turbomachines," Journal of Fluids Engineering, Dec. 1980, vol. 102, pp. 412–419 R. Schodl.

Fluid Mechanics, $2^{nd}$ Edition, Frank M. White, p. 310, McGraw–Hill, 1986.

"An International comparison of integrated technques for traverse methods in flow measurement", F. C. Kinghorn & A. McHugh, La Houille Blanche, No. 1, 1977, pp. 50–57.

"Point Velocity methods for flow–rate measurements in asymmetric pipe low;" S. Frank, C. Heilmann, and HE Siemann; Flow Meas. Instrum., vol. 7, No. 314, 1996, pp. 201–209.

"Development of an Optical Volumetric Flowmeter", Gas Research Institute, Final Report, Apr. 1985–Mar. 1989, Report No. GRI 89/0201.

*Primary Examiner*—Stephen C. Buczinski
*Attorney, Agent, or Firm*—Conley, Rose & Tayon, P.C.

[57] ABSTRACT

The present invention provides an optical device for the measurement of flow rates of fluid through a pipe. The device broadly comprises a narrow frequency light source, an optical delivery system, a collector for light scattered from particles in the fluid, and a photo detector. In a preferred embodiment, the optical delivery system and the collector are contained within the pipe.

45 Claims, 5 Drawing Sheets

OPTICAL FLOW METER INTEGRALLY MOUNTED TO A RIGID PLATE WITH DIRECT OPTICAL ACCESS TO THE INTERIOR OF A PIPE

FIELD OF THE INVENTION

This invention relates to an optical flow meter system for measuring the flow of fluid in a pipeline.

BACKGROUND OF THE INVENTION

One of the requirements for the successful operation of any pipeline is the capability to accurately measure flow rates at many locations within the system. A number of different flow meters are currently commercially available for this purpose, each having its own advantages and limitations. Existing meters can be classified into three main types, namely obstruction meters, kinematic meters and non-intrusive meters.

Obstruction meters determine flow rate in an indirect fashion by introducing a physical obstruction directly into the flow and measuring the influence of the obstruction. For example the pressure drop across a flow restriction is often measured and correlated with the flow rate. Examples of this approach include orifice meters, venturi meters and critical flow nozzles [ref. *Experimental Methods For Engineers,* Fourth Edition, McGraw-Hill Book Company, J. P. Holman and W. J. Gajda, Jr., Chapter Seven]. Another example of an obstruction meter is the vortex meter, in which the obstruction causes vortex shedding. The shedding frequency is determined by means of strain sensors, thermal sensors, or pressure sensors. The shedding frequency increases with flow rate.

Obstruction meters extract energy from the flow and are therefore inherently inefficient because additional pumping capacity is required to overcome the induced pressure drop. The physical obstruction also prevents the use of pipeline-pigs for maintenance and diagnostics. Component wear can cause a shift in the discharge coefficient or shedding frequency, and therefore regular maintenance of these devices is required. Pressure or load transducers are normally mounted next to the obstruction, and therefore local power is required. For pipelines transporting flammable or explosive fluids, appropriate explosion-proof enclosures are required for these transducers. Finally, these meters have a limited turndown ratio owing to the nonlinear relationship between flow rate and pressure drop.

Kinematic type meters determine the flow rate by directly sensing the actual velocity using a turbine blade assembly that rotates kinematically with the flow. The rotational speed of the turbine is measured using a frequency pickup and is empirically related to the flow rate using an experimentally determined coefficient. These meters provide an output that is approximately proportional to volumetric flow rate and substantially independent of density. The primary disadvantages of this class of meter are the presence of moving parts, the obstruction to flow, the need for calibration, the requirement of electrical power and the physical size.

The third class of meter relies on non-intrusive methods to determine flow rate. The ultrasonic flow meter is the only meter in this category that has been commercially developed for use in high pressure natural gas pipelines. The operating principle is to compare the upstream and downstream times of flight of an acoustic pulse from one transducer to another, which are located near the inside surface of the pipe. The flow is unrestricted and therefore these devices do not produce any significant pressure drop. However, these devices require a relatively long installation length, are limited to larger pipe sizes, can suffer from acoustic noise and are sensitive to swirl in the flow.

Each of the meters described above has deficiencies in one or more of the following areas:

Size: The device should be small enough to permit installation in limited space.

Low Maintenance: Moving parts should be avoided to reduce maintenance requirements.

Power Supply: The device should not require electrical power at the meter.

High Turn-Down: The device should provide accurate measurement of flow rates over a 50:1 turndown ratio.

Optical flow measurement offers the potential to address all of the above-noted deficiencies of "prior art" meters.

For example, flow rate may be determined by measuring the velocity of micron-sized particles suspended in a flow field. This is accomplished by determining the time-of-flight of these particles as they move between two discrete regions illuminated by laser light. This basic concept was proved by D. H. Thomson ["A Tracer Particle Fluid Velocity Meter Incorporating a Laser", Jour. of Sci. Inst. (J. Phys. E.) Series 2, Vol. 1, 929–932 (1968)] using a large gas laser, Kosters prism, two convex lenses, an imaging lens and a photomultiplier.

The time-of-flight concept has been applied to a device to measure the air speed of an aircraft (as described in United States Patents ("USP") U.S. Pat. Nos. 4,887,213; 5,046,840 and 5,313,263). Three pairs of laser sheets are projected into free air through a window located in the side of the aircraft fuselage. Small particles in the atmosphere passing through the laser sheets produce scattered light that is collected from each pair of laser sheets. This light is imaged onto photodiodes and the resulting signal is processed to determine the velocity vector. However, this prior device is designed for the aviation environment and cannot be used in pipeline applications.

Optical techniques have also been employed by numerous investigators to make measurements in laboratory environments, particularly in wind-tunnels and turbo machinery, notably R. Scholdl ["A Laser-Two-Focus (L2F) Velocimeter for Automatic Flow Vector Measurement in Rotating Components of Turbomachines", Transaction of the ASME, Vol. 102, p 412, Dec. 1980]. Additionally, UK Patent 2,295,670 describes such a configuration in which laser light from an argon ion laser is split by a Rochon prism, made parallel by a lens and then focused into two focused spots. Scattered light produced by particles passing through the two spots is imaged onto two photoelectric converters. Velocity is determined on the basis of the transit time of the particles passing between the two spots. U.S. Pat. No. 4,125,778 claims a similar device except that the relative position of the two spots could be rotated using an optical component.

A variation on the time of flight principle using laser diode arrays (i.e. multiple lasers in a monolithic device) was applied by M. Azzazy ["GRI Report 89/0201 Development of an Optical Volumetric Flow Meter" (1989)] to measure the velocity profile inside a high pressure natural gas pipe through a glass window. In this case, the image of the diode array produced a series of spots in space and the light scattered by small particles was collected and converted to an electrical signal. The frequency content of the signal and the spacing of the spots of light were then used to determine the flow velocity. Measurements were obtained at a series of locations by mechanically translating the measurement system which was located outside the pipe. The bulky size of the system, in combination with the large optical window, rendered it impractical for broad commercial applications.

Improvements to this system (i.e. using laser diode arrays) are described in U.S. Pat. No. 5,701,172 issued Dec. 23, 1997 assigned to Gas Research institute. The patent also describes the system used in combination with a hologram and a window in a pipe to produce multiple measurement locations along one pipe diameter within a pipeline. All of the illustrations and examples of the patent are limited to the case where the optical source and lens are external to the pipeline.

SUMMARY OF THE INVENTION

The present invention provides an optical device for generating a signal which contains information which may be used to describe the fluid flow on the basis of the motion of suspended particles contained in a fluid flowing through a pipeline, said device comprising: a narrow frequency light source; one or more optical delivery systems; one or more collectors which collect light scattered by particles in the flow; and one or more photo detectors. In a preferred embodiment, the optical delivery system(s) and collector(s) are contained within the pipeline.

That is, the device of the present invention generates signals based on the light scattered by particles flowing through a pipeline.

The present invention further provides an optical device for generating information to determine the flow rate of a fluid within a pipe comprising in cooperating arrangement an orifice fitting having mounted therein a rigid plate. The rigid plate holds at least one optical delivery system providing at least two parallel beams of light and a collector receiving scattered light from particles in the fluid moving through the pipeline.

The optical device of this invention contains two optical sub-systems, namely a "delivery" system and a "collection" system. The delivery system is designed to provide a parallel pair of light beams (preferably laser beams), separated by a known distance, through the center of a pipeline. The optical delivery system may comprise one or more of: a collimator, a light splitter and a focussing lens. The two beams are preferably perpendicular to the axis of the pipe, with one light (laser) beam located upstream of the other. The light beams are conditioned (focused) such that they are most intense at the location within the pipe that the measurement is to be made. Small particles suspended in the natural gas flow pass through the two beams, producing brief pulses of scattered light. These pulses of light are received by the second optical sub-system (the "collection" system) which collects scattered light from a small region of interest. The optical sub-systems are aligned such that the optical collection region is coincident with the most intense regions of the light beams, which defines a localized measurement volume.

The optical flow meter is invested into the pipeline either via an existing meter fitting or a new fitting. Most preferably, this is achieved by encasing critical elements of the optical flow meter in a housing which is adapted to an existing meter fitting.

Thus, the present invention enables the use of an optical system to measure the flow of fluid in a pipeline, especially the flow of natural gas in a high pressure pipeline.

The present invention further provides a process for measuring the flow rate of a fluid having entrained suspended particles through a pipe comprising comparing the timing of light scattering events from at least one light sheet in said pipe to the light scattering events from at least one other light sheet in said pipe using one of the devices described above and comparing the events from both light sheets to generate a histogram (called a corrologram) which has a characteristic peak corresponding to the flow rate.

The optical flow meter described herein is a robust device which may be used in a remote environment.

DETAILED DESCRIPTION

As used in this specification a narrow frequency light source means a system that provides essentially monochromatic light having a wavelength preferably within a range of 50 nanometers (nm), most preferably within a range of 10 nm.

The measurement volume is the location or locations where the sheet of light or beam of light is focused within the interior of the pipeline to detect particles passing through such location(s); particles scatter light from the optical delivery system and scattered light is gathered by the collector.

In accordance with the present invention, the input for and output from the optical delivery system and collector communicate externally from the pipeline preferably via an optical transmission path, most preferably an optical fiber(s). The optical fiber(s) may be continuous or they may include appropriate coupling devices such as those sold by AT&T under the trademark ST connectors. However other means for providing input and receiving output from the device of the present invention would occur to those skilled in the art.

Preferred embodiments of the invention will now be described in detail with reference to the accompanying drawings.

Figure 1:
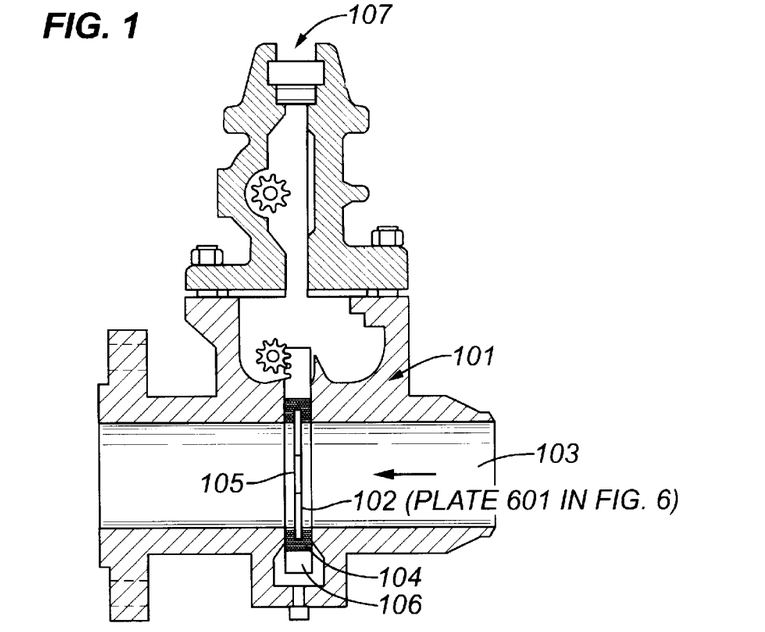
FIG. 1 is a diagram of a commercial orifice meter fitting.

The flow meter of the present invention may be installed in the pipeline, for example between adjacent flanges. However, such an installation is not easily removed for maintenance or servicing. In a preferred embodiment of the present invention the device is installed in a removable cooperating plate and fitting such as an orifice plate carrier and fitting. FIG. 1 shows a cross section of a typical commercial orifice fitting.

The standard orifice meter in the natural gas industry such as that shown in FIG. 1 consists of a meter body 101 that permits the orifice plate 102 to be inserted into or removed from a high pressure pipe 103. The orifice plate 102, which is a round steel plate with a hole in the center, is fitted with a thick rubber gasket 104 around its circumference. This gasket provides a seal when the plate is in use to ensure that all of the flow passes through the central hole 105. The gasket and orifice plate fit into a larger rectangular "plate carrier" 106. The plate carrier is inserted into the body of the meter 101 through a closable opening 107 and holds the orifice plate 102 in place. The housing of the meter can generally be of two types: those that allow the plate to be inserted and removed while the system is under pressure; and those that require that the pipe be depressurized before the orifice plate can be removed.

Figure 2:
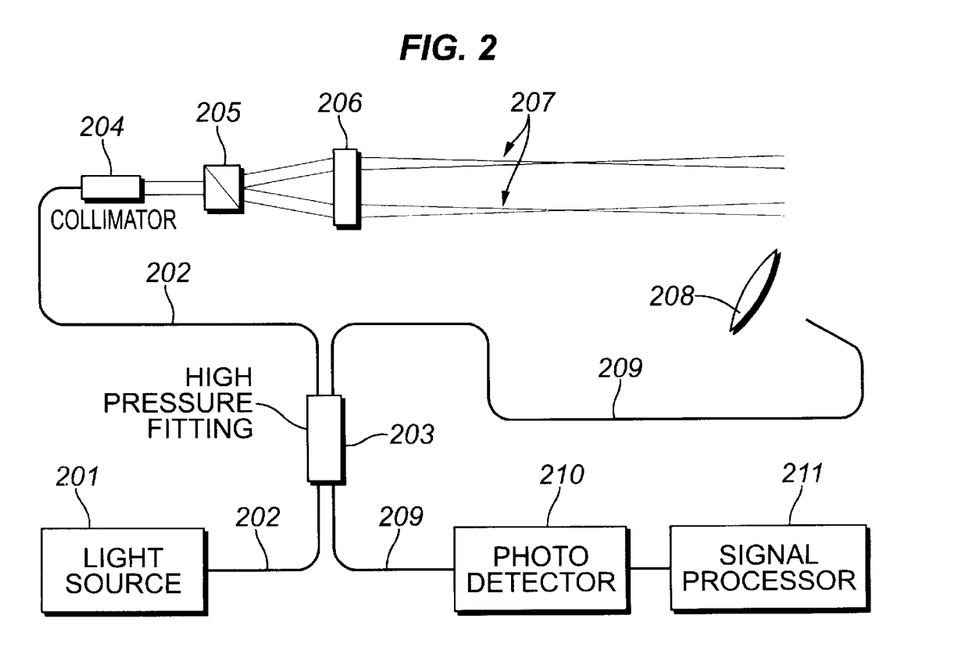
FIG. 2 is a schematic diagram of an optical meter according to this invention.

FIG. 2 shows a preferred configuration of the optical flow meter. A narrow frequency light source 201 (preferably a laser) is located at some distance from the actual meter housing, and the energy emitted by the laser is transmitted to the meter via a single mode polarization maintaining optical fiber link 202 (i.e. an optical fiber). The optical fiber enters the body of the meter through a high-pressure fitting 203 accommodating both the transmission fiber and multimode receiving optical fiber 209. The transmission optical fiber terminates in a collimator 204. The beam exiting the collimator then passes through a beam splitting prism 205 to generate two beams, followed by a focusing lens 206 which produces parallel light beams 207 focused within the pipe typically at or adjacent to the centerline of the pipe for a single point measurement using two sheets of light. As shown in FIG. 2 the parallel light beams are focused, that is they narrow to a waist at or within the measurement volume (and they diverge on each side of the measurement volume). This results in an intensely illuminated region at the light beam waist preferably a high intensity sheet of light (but it could also be a spot of light). Note that for any velocity measurement at a specific location at least two closely spaced sheets of light are required. For measurements at more than one location the measurement volumes may be located at different positions within the cross-section of the pipe. Light scattered by small particles (micron and submicron sized particles) passing through the beam in the measurement volume, is collected by a collection lens 208 (which collection lens 208 is preferably a refractive doublet or diffractive/refractive doublet) that focuses the collected light onto the end of a receiving optical fiber 209. The receiving optical fiber 209 transmits the scattered light pulses back to a photo detector 210 (avalanche photodiode (s) or photo multiplier tube(s)) located near the laser. The electrical output from the photo-detector is analyzed in a signal processor unit 211 that correlates the optical pulses and determines flow rate at the measurement volume. It will be appreciated by those skilled in the art that the small particles referred to above are typically found in fluid flows (if an ultra clean fluid is being measured, it may be necessary to add such particles).

Each particle that passes through the pair of light beams (or sheets) emits two pulses of scattered light, separated by an amount of time $\Delta t$. By measuring $\Delta t$, and knowing the physical spacing between the two beams (S), it is possible to determine the average velocity from the relationship $U_{avg}$= S/$\Delta t$. Correlation techniques are used to analyze streams of pulses produced by numerous particles passing through the beams over a prescribed period of time. This technique eliminates the ambiguity that results from overlapping pulse pairs, plus it minimizes the influence of single pulse events which occur when a particle passes through only one of the two beams. One method of correlating high data rates is outlined in U.S. Pat. No. 4,887,213.

FIG. 3 shows a preferred method of calculating the velocity of a fluid. The figure consists of three components: a plot of output signal versus time (a); the process of digitizing an individual pulse (output) (b); and a histogram (corrologram) of transit velocities (c). The relationship between these three aspects of the velocity calculation are described below.

Figure 3A:
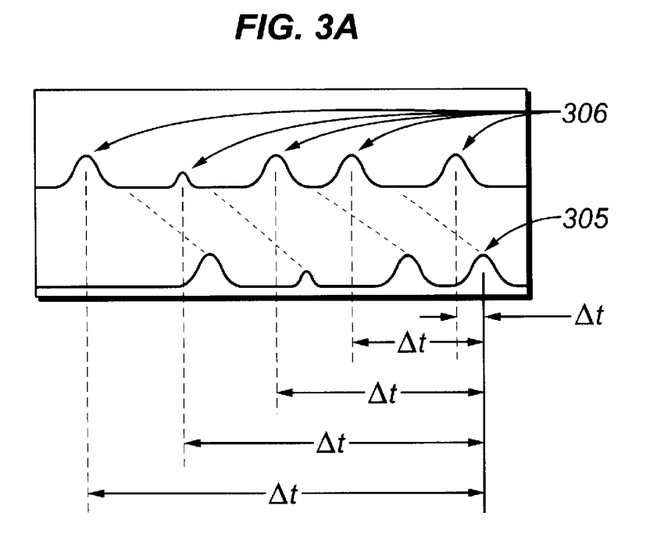
FIG. 3 illustrates the steps in processing the data from the device.
Figure 3B:
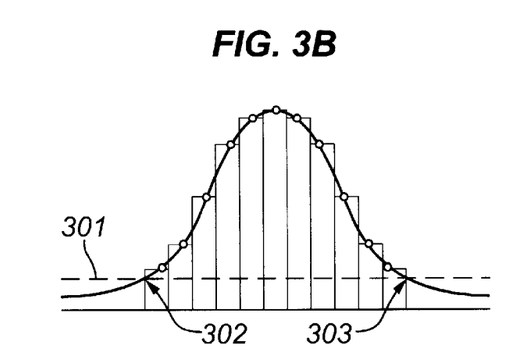
Figure 3C:
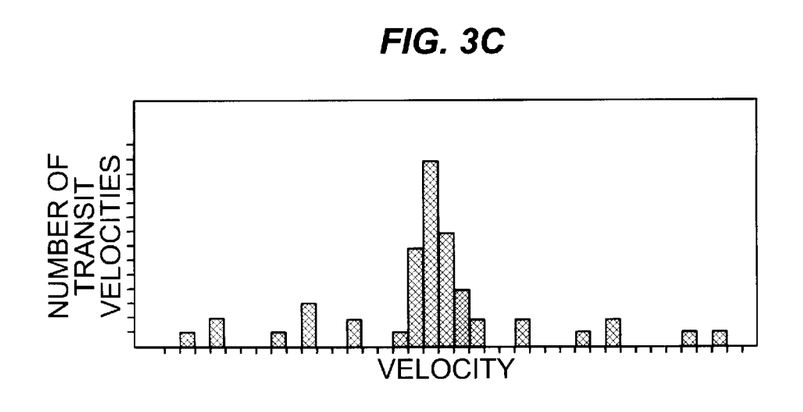

The signals, such as those shown in FIG. 3(a), are generated by the device, with a characteristic lag between events (detection of scattered light) on the upstream and downstream channels (e.g. photo detectors). Each of these pulses is digitized when a certain threshold 301 (e.g. exceeding the background noise) is exceeded as shown in (b). The time that the pulse occurred has to be identified for each pulse. The time of occurrence (temporal centroid) is determined, either by midpoint between the time when the signal exceeds the threshold 302 and when the signal falls below the threshold 303, or by a weighted average of the digitized pulse shape, as shown in FIG. 3(b). The time and amplitude of the pulses are stored for later reference. Each pulse that occurred on the downstream channel (e.g. 305) is compared to previous pulses that occurred on the upstream channel 306 (limited by a time which is equal to or greater than the transit time for the minimum detectable velocity) to generate a series of potential transit times $\Delta t$ for each down stream pulse. Each transit time is converted into a possible transit velocity by dividing the beam spacing by the transit time. This series of potential transit velocities are accumulated and stored in a histogram called a corrologram, such as that shown in FIG. 3(c). The corrologram shows the number of possible transit velocities that lie in a narrow range called a "bin". The number of events in each bin is represented by the bars in FIG. 3(c). The average transit velocity can be determined by the average of the velocities in the most populated bin (and the appropriate number of neighboring bins).

Schemes that weight the importance of the transit velocity based on the similarity of the amplitudes of the upstream and downstream pulses may be used to increase the accuracy. The premise in such schemes is that pairs of pulses caused by the same particle should be of similar amplitude, and that since the objective is to determine which pairs correspond to one particle passing through both sheets, the pairs with similar amplitude should be weighted more heavily.

This method can be generalized to the case where both pulses are generated by the same detector. In this case all pulses are considered as possible upstream and downstream pulses (since the upstream and downstream information is indistinguishable), and the corrologram still shows a characteristic transit velocity.

Broadly the present invention seeks to provide a process for determining the velocity of a fluid moving through a pipe comprising converting the electrical signals generated by a device according to the invention comprising:

(a) digitizing each pulse of the detector output signal caused by collected light scattered from a particle passing through a light sheet exceeding a threshold above the ambient noise and determining its temporal centroid;

(b) comparing the temporal centroid of each pulse that could have originated on the downstream sheet of light to the time of the pulses that could have occurred on the upstream beam in the recent past to obtain a possible transit time of a particle from one sheet of light to another;

(c) converting each transit time to a transit velocity, by dividing the distance between the sheets by the transit time and recording the transit velocities in a corrologram;

(d) identifying the peak in the corrologram generated over a finite time period by the large number of transit velocities clustered at a specific velocity;

(e) averaging transit velocities within that cluster in the corrologram.

The light source and the photodiode are external to the pipe; however a preferred embodiment of the invention requires that the optical lenses be located within the pipe. The advantage of placing the optical lenses inside the pipe is that for high pressure applications, windows are not required, and the optical system is confined to the inside of the pipe thereby reducing the safety issues associated with exposed laser light sources. The use of optical fiber also means that the electronics and processing system may be located many hundreds of meters from the actual measurement location. Additional advantages of the optical device of this invention include: (a) it does not introduce a pressure drop in the pipeline; (b) it may require less than five centimeters of pipe length for installation; and (c) it does not have moving parts that can wear over time. The device is fully compatible with a range of pipeline environments including high-pressure natural gas. Furthermore, no electrical supply is required at the meter location.

The optical device described above may be constructed using a number of alternative components and each of these individual configurations may be installed in various mechanical housings. One preferred embodiment described below is tailored to be installed in a standard orifice plate carrier housing used in natural gas pipeline systems. This embodiment is particularly attractive to those users who have many orifice fittings already installed in the field.

Figure 4:
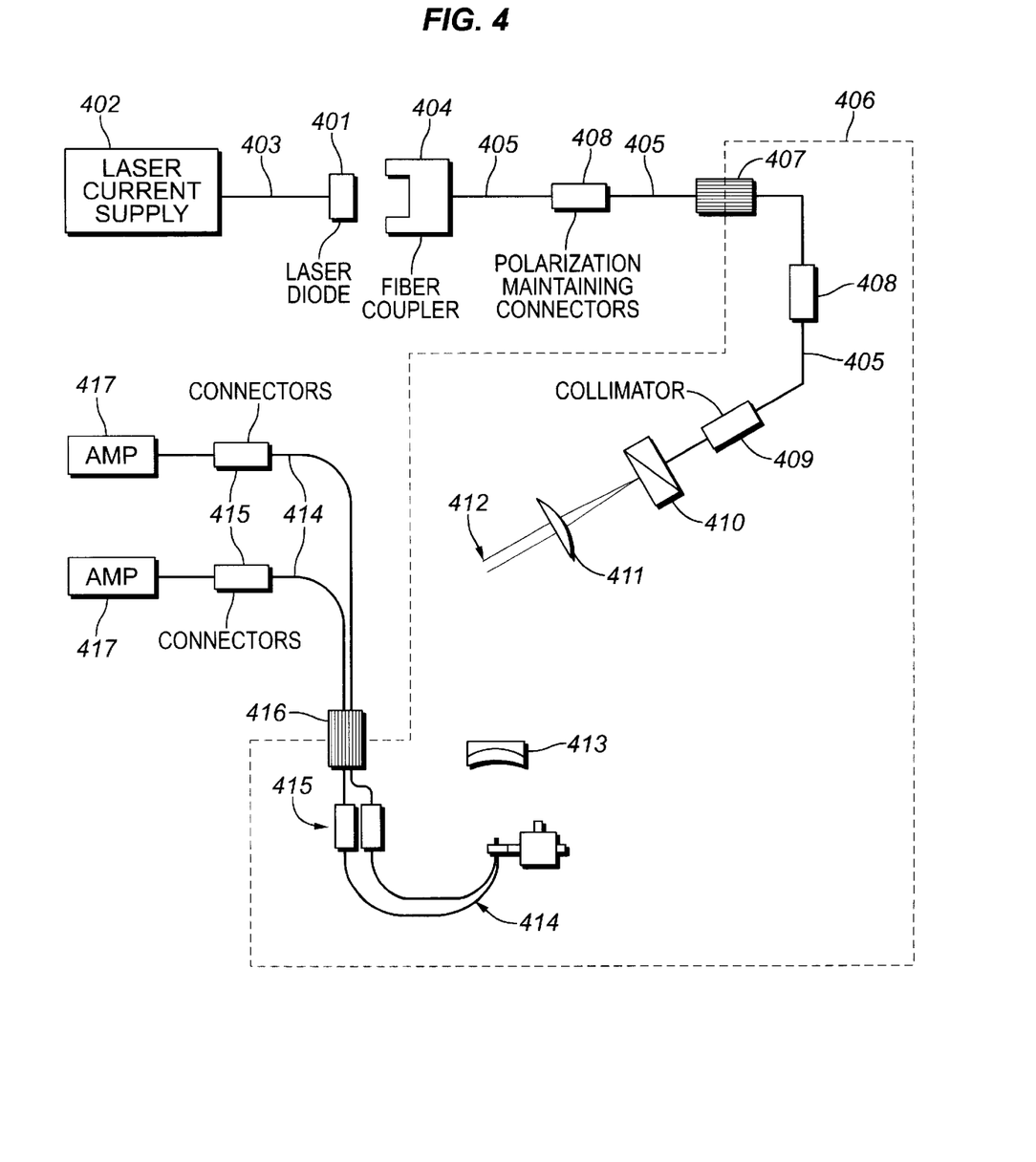
FIG. 4 is a schematic optical layout of a preferred embodiment of this invention with specific components.

FIG. 4 shows the optical components used in a preferred design of a plate that replaces the plate carrier, and Table 1 provides a detailed description of each component.

TABLE 1

Optical Components in FIG. 4

| Item # | Description | Supplier | Model/Part Number |
|---|---|---|---|
| 401 | 150 mW Laser (830 nm) | SDL | SDL-5421-G1 |
| 402 | Laser current driver | Seastar | LD 1000 |
| 404 | Laser/fiber coupler | OZ Optics | LDPC-02-830-5/125-P-40 |
| 407 | High pressure pass-through fitting | PAVE Technology Inc. | PT-SS-150-FOSM- |
| 408 | FC Polarization-maintaining connector | OZ Optics | |
| 409 | Collimator with vent hole in housing to equalize pressure | OZ Optics | LPC-04-830-5/125-P-0.86-3.OGR-40-3-3A-0.6-SP |
| 410 | Wollaston prism (0.5° or .75°) V coated for 830 nm | Karl Lambrecht Corp. | WQ6.35-05-V830 or WQ6.35-075-V830 |
| 411 | Cylindrical Lens cut down to 6.35 mm sq. | Melles Griot | 01 LCP 001 or 01 LCP 005 |
| 413 | Cemented doublet 15 mm diameter | NOVA designed, built by Lumonics Optics | |
| 414 | Collection fibers (multimode) NA = 0.22, low OH | Thor Labs (3M product) | FG-200-LCR |
| 415 | SMA connectors | Thor Labs | 10230A |
| 416 | High pressure pass-through fitting | PAVE Technology Inc. | PT-SS-150-FG200- |
| 417 | Silicone Avalanche Photo Diode (APD) with transimpedance amplifier | EG & G Optoelectronics | C30657-010-QC-06 |

Preferred Optical Delivery System

Light energy is provided by a 150 mW near-infrared diode laser 401 (such as that sold by SDL Inc. (San Jose, Calif.)), driven by a laser current supply (402) such as that sold by Seastar Optics Inc. (Sidney, BC) that is connected to diode laser 401 by an electrical cable 403. The laser diode is directly pigtailed to polarization-maintaining fiber (405) using laser to fiber coupler (404), such as that sold by OZ Optics Ltd. (Carp, ON). The fiber enters the high pressure housing (406) through a pressure fitting (407) such as those sold by PAVE Technology Co. Inc. (Dayton, Ohio). For convenience an FC polarization maintaining connector (408) is located on either side of the bulkhead such that the individual assemblies can be easily separated. The light energy exiting the fiber 405 is collimated into a uniform laser beam using a collimator 409 (which uses a 0.25 pitch GRIN lens) such as those sold by Oz Optics Ltd. The collimator has a small vent hole to prevent damage to the optical fitting under pressure. The beam is then split into two beams using a Wollaston prism 410 such as those sold by Karl Lambrecht Corp. (Chicago Ill.). If required by space restrictions, the two beams may reflect off a planar mirror towards a cylindrical lens 411, otherwise the two beams project directly to the cylindrical lens 411. The cylindrical lens refracts the beams such that they become parallel. The cylindrical lens also focuses each of the beams such that two high intensity laser sheets are produced in the measurement volume 412. This may be at a distance of approximately 50 mm from the lens.

Preferred Optical Collection System

Scattered light, caused by particles passing through the waist regions of the two sheets, is collected and focused onto the ends of two 200 micron multi-mode optical fibers 414 by a specialized collection lens 413. This lens is preferably designed to prevent variations in refractive index from altering the focal length of the collection optics. (A detailed description of a novel collection lens is provided in the next section.) The multi-mode optical fibers pass through a second pressure fitting 416 as described above with SMA 905 connectors 415 on either side for easy removal. The collected light energy is transmitted by the multi-mode fibers 414 to a pair of avalanche photodiodes with built-in transimpedance amplifiers 417 such as those manufactured by EG&G Canada Ltd., Optoelectronics Division. The voltage outputs from the photodiodes are digitized and processed to determine particle velocity.

Lens Operation in High Pressure Environments

Typical imaging systems use a lens which refracts light passing through it to form an image of the object at the desired location. Refraction occurs when light rays pass from the external medium (usually air) to the lens material (usually glass) or vice versa. Refraction, or the amount of bending of the light rays depends on the index of refraction of the two media in contact, and is governed by Snell's Law. Snell's Law states that $n_1 \sin \theta_1 = n_2 \sin \theta_2$, where n is the index of refraction of the medium, and θ is the angle that the ray makes with a normal to the surface, and the indices 1 and 2 refer to the two media in contact.

If the index of refraction of the surrounding medium can change significantly, then the performance of the optical system will depend on the external medium. For instance, the surrounding medium could be air at atmospheric pressure, a high pressure gas, or a liquid.

To successfully image particles inside a high pressure natural gas environment such as a pipeline, the optical system must work correctly at the full range of pipeline pressures without adjustment. For practical purposes the system should also work at atmospheric conditions to facilitate the initial setup and testing. Any mechanical adjustment of optical alignment to compensate for the changes in refractive index of the gas in the pipe would normally be very difficult to perform inside the pressure-containing vessel and would have to be done continuously to account for changes in gas pressure and temperature and composition.

Collection Lens

The preferred collection lens images a particle to an aperture independently of the index of refraction of the surrounding medium. A light detector is located behind the aperture. The collection lens should also meet the following constraints. The object and image should be small relative to the lens. The object and image should be near the optical axis of the lens. The object (e.g. the particulate in the measurement volume) and its image should be at specifically defined locations. To achieve lens performance that is independent of the index of refraction of the surrounding medium, the position of the object is restricted. Preferably the wavelength of light is fixed.

This performance may be achieved in a lens having concave first and last surfaces which are defined by spheres centered at the object and image locations respectively. All refraction of the light as it passes from the object to the image occurs internal to the lens. The lens has the appropriate light refraction to be consistent with the object and image location. If the above criteria are met the lens will ensure that all rays from the object enter the first surface at a perpendicular and leave the last surface at a perpendicular, hence there will be no refraction at the surface in contact with the surrounding medium. The light from the image is directed to the detector or an optical fiber feeding the detector.

The internal refraction of light can be achieved by a number of methods including using: a material with a radial gradient in the index of refraction; a sealed air or gas space between the elements; a sealed liquid between the elements; a cemented doublet with two materials of differing index of refraction; a cemented lens of more than two elements; or a combination of the above.

Figure 5:
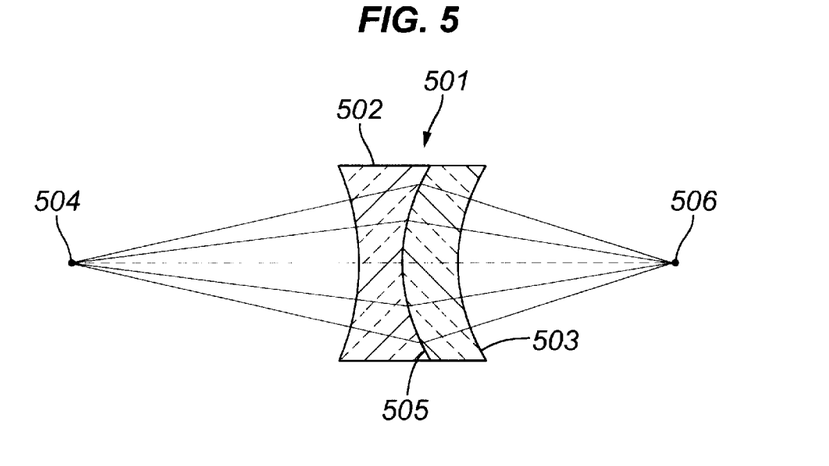
FIG. 5 is a schematic diagram of a preferred form of a collection lens.

The preferred embodiment of the collection lens consists of a cemented doublet with two different materials with a large difference in refractive index and high transmission at the wavelength(s) of light of interest. FIG. 5 shows the preferred lens 501 comprising a low index of refraction material 502 and a high index of refraction material 503. The high and low index of refraction materials are cemented together over a continuous surface 505 which may or may not be spherical.

The surface of the low index of refraction material facing the object 504 (e.g. the particle scattering light) has a radius of curvature so that light scattered by particles strikes the surface facing the particles normally (at right angles). The external surface of the high index of refraction material 503 faces the detector 506 (or optical fiber leading to the detector) and has a radius of curvature so that point 506 is at the center of a sphere defined by the radius of curvature.

The preferred collector lens eliminates sensitivities to the index of refraction of the surrounding fluid which will vary with temperature, pressure, and composition of the fluid.

There are computer programs available which will perform the calculations to define the curvature of the doublet internal surfaces 505 based on the indices of refraction of each component. One such computer program is available under the trademark ZEMAX, sold by Focus Software of Tucson Ariz.

In a further embodiment of the present invention the cylindrical lens in the delivery system is made insensitive to the index of refraction of the surrounding fluid by use of a cylindrical doublet using the principles described above. That is, the light strikes at normal incidence (90°) at any lens surface where the surrounding fluid is in contact with the lens.

Mechanical Design

Figure 6:
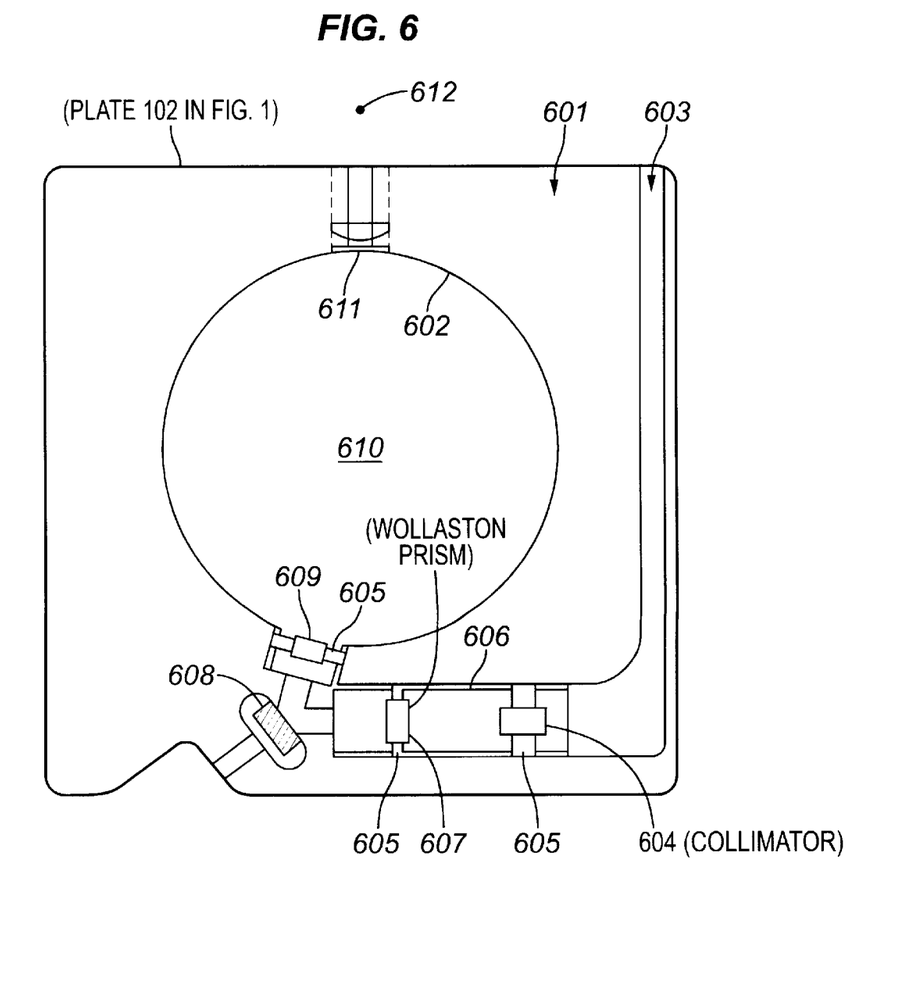
FIG. 6 is a diagram of a rigid plate which fits into an orifice meter and houses the optical system.

In a preferred embodiment, the optical device of the present invention is constructed such that it is mounted within a rigid plate and installed within a standard orifice fitting. Such a plate is illustrated in FIG. 6 showing the location of the principal components. The plate carrier and orifice plate is replaced by a single plate 601 with a central hole 602 that preferably matches the inside diameter of the pipe. The optics of this invention are mounted in the plate 601 itself and the plate would be raised and lowered in the same manner as a standard plate carrier. The plate therefore provides a rigid, pre-aligned assembly that can be easily inserted into the orifice fitting. The optical fiber which delivers light from the light source fits in a slot 603 in the plate. The fiber terminates at the collimator 604 which is held in a slot 606 by supports 605 which are designed to be adjustably positioned in the slot 606. The light leaving the collimator 604 strikes the Wollaston prism 607 and is split into two beams. The beams of light reflect off a mirror 608 and are focussed and made parallel by a cylindrical lens 609 which is held in place by adjustable supports 605. The beams are focussed to a waist at the center of the pipe where the (small) measurement volume 610 is located. Light scattered by particles passing through the measurement volume 610 is collected by a refractive doublet 611 which is insensitive to the index of refraction of the surrounding fluid. The light is focussed to an image point 612 and enters one of two optical fibers leading to the detectors. One fiber receives the image of the upstream sheet of light and the other fiber receives the image of the downstream sheet of light.

The angle between the optical delivery system and the collector may be any angle, including 180°, or direct backscatter. However, a particularly preferred angle is in the range of 5° to 25° from forward scatter. The orifice fitting has several threaded holes in the body for pressure measurement and optional crank handle locations. These holes provide locations for the high pressure fiber optic pass-through fittings to be installed, thereby providing the necessary optical communication between the internal and external components. Installation of the optical system within the orifice fitting has the advantages of providing highly rangeable measurement with virtually zero pressure drop, without the expense and time of having to modify the existing piping.

Flow Measurement Based On Velocity Data

When the velocity distribution in the pipe is well conditioned (for example, in fully developed flow, or downstream of a flow conditioner), a single point centerline measurement is generally sufficient to achieve an accurate measurement of volumetric flow rate. In this case the flow rate is determined by the product of the centerline velocity and a coefficient which ranges from between about 0.5 for fully laminar flow and about 0.86 for fully turbulent flow. The value of the coefficient is a function of the pipe Reynolds number and pipe roughness and can be determined from an empirical expression [ref. White, Frank M., "Fluid Mechanics", 2nd ed. McGraw Hill 1986, p.310]. When a flow conditioner is located upstream of the measurement system a geometry specific correlation must be used to determine the average velocity from the measured centerline value.

When the approaching flow is not fully developed, or is poorly conditioned, it is impossible to obtain an accurate measurement of volumetric flow rate on the basis of the centerline velocity alone. If measurements are made at sufficient locations within the pipe however, an accurate estimate of the flow rate can be made. Techniques to select the most appropriate measurement locations are outlined by F. C. Kinghorn and A. McHugh "An International Comparison of Integration Techniques for Traverse Methods in Flow Measurement", La Houille Blanche, No. 1,1977 and S. Frank, C. Heilmann and H. E. Siekmann, "Point-velocity Methods for Flow-Rate Measurements in Asymmetric Pipe Flows", Flow Meas. Instrum., Vol. 7, No. 34, pp. 201–209, 1996. For example, using a total of five data points it is possible to reduce the error for a moderately ill-conditioned profile to less than 1.0%–2%, and for very ill-conditioned profiles the errors are generally less than 4%.

In a preferred embodiment of the invention the total flow rate through the pipe is determined using measurements at five points located in the pipe cross-section. Most preferably, these five points are located, according to the locations specified by Frank, Heilmann and Siekmann. One point is located at the center of the pipe, and the other four points are located a distance of 0.762R from the center, where R is the radius of the pipe. Further, these four points are spaced equally around the circumference of a circle with radius 0.762R. These locations are designated subscripts: 0 for the center point, and 1, 2, 3 and 4 for the remaining four points. A ratio $a_u$ is determined according to the following formula:

$$a_u = \frac{\frac{1}{n}\sum_{j=1}^{n} v_j}{v_0}$$

where v is the velocity at each location designated by the subscript. The value of $a_u$ is used to select a center-point correction factor $a_v$ from the following table:

| Criteria | Center-point factor, $a_v$ |
|---|---|
| $a_u > 0.86$ | 0.8941 |
| $0.86 > a_u > 0.83$ | 0.8526 |
| $0.83 > a_u > 0.80$ | 0.8167 |
| $0.80 > a_u$ | 0.7575 |

The average flow rate U (i.e. the volumetric flow rate divided by the pipe cross sectional area) can be determined from:

$$U = \frac{1}{6}(v_1 + v_2 + v_3 + v_4 + 2a_v v_0)$$

The Optical Flow Meter described here can easily be extended to permit the measurement of velocities at multiple points, and therefore flow rate measurements can be obtained with the proposed device in ill-conditioned flows.

Multiple measurement volumes may be accomplished mechanically by multiple implementations of the single point techniques described above (i.e. multiple sets of delivery and collection systems). However, optical systems may also be used to generate multiple measurement volumes using a single optical element. This may be done for example using a prerecorded hologram or by using a manufactured diffractive optical element (e.g. a diffraction grating). Diffractive or holographic optical elements may also be used to collect light from the multiple measurement volumes.

The optical flow meter of the present invention is illustrated by the following non-limiting example.

Experimental Results

The accuracy of a prototype (as described relative to FIG. 6 above) was tested in a high pressure (5500 kPa) natural gas facility. A calibrated NPS 4 orifice meter that was used in the development of the revised (1998) API (American Petroleum Institute) orifice standard was used as the reference. The accuracy of this mass flow rate measurement is considered to be within ±0.3%.

A NOVA 50E perforated plate flow conditioner was located 42 D (pipe diameters) upstream of the device to ensure a known and repeatable fully developed flow profile. Extensive measurements taken using pitot tubes and hot film anemometers have shown that the peak velocity (centerline) of a fully developed profile under the test conditions is 1.16 times the average velocity. Development of the NOVA 50E flow conditioner is explained in reference: Karnik, U., "A compact orifice meter/flow conditioner package", $3^{rd}$ International Symposium on Fluid Flow Measurement, Mar. 20–22, 1995.

In these tests the average velocity was varied between 10 and 25 m/sec. The centerline velocity measurement obtained with the optical flow meter was compared to a predicted centerline velocity based on the orifice meter data, the shape of the velocity profile that is produced by the flow conditioner, and the temperature, pressure and gas composition measurements. Temperature and static pressure readings were taken at the measurement location to allow accurate determination of gas density, and also the index of refraction. The total uncertainty in the reference velocity was estimated at ±0.6%.

In the prototype the cylindrical lens in the optical delivery system was not insensitive to the index of refraction of the surrounding gas. Therefore as the refractive index of the gas increased with pressure, the spacing of the two sheets of light increased slightly. An optical design program was used to determine the necessary correction in beam spacing relative to the measured spacing in atmospheric air. For these tests a 5.8% correction was required and applied. Note that a cylindrical lens doublet designed using the same principle as the collection lens doublet would not require any such correction to the beam spacing measurement that is used in the velocity calculations.

Figure 7:
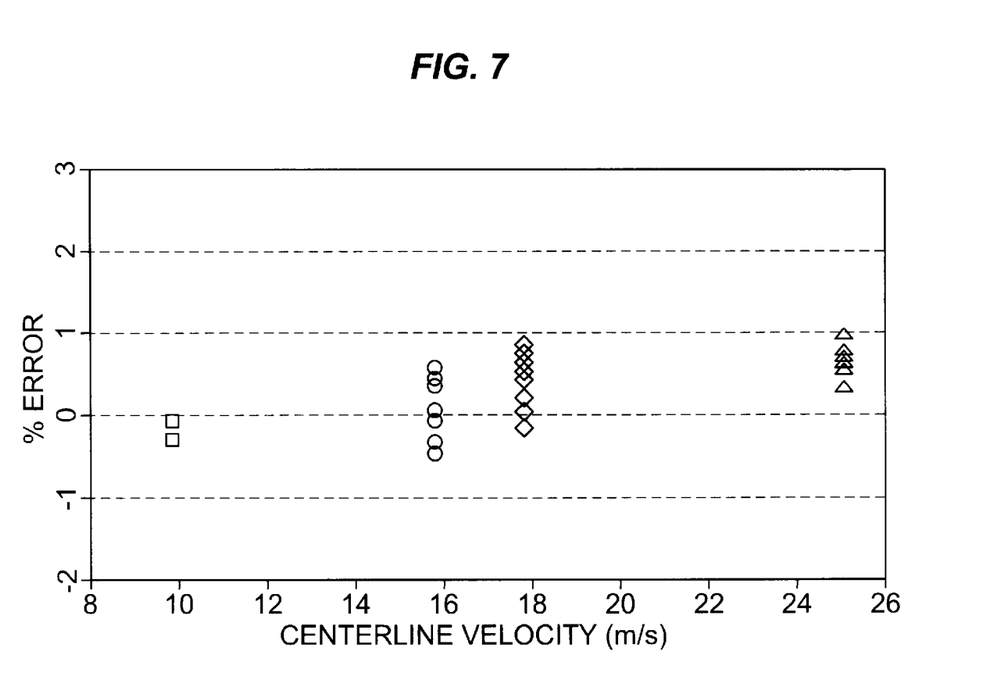
FIG. 7 is a plot of experimental results of the device.

FIG. 7 shows the data obtained over a two-day period of testing. In FIG. 7 each point is a data point for one velocity measurement. The ordinate (Y axis) shows the deviation of the optical measurement from the reference orifice meter. FIG. 7 shows good overall agreement for the velocities obtained using the reference system and the optical flow meter of the present invention.

What is claimed is:

1. An optical device, said optical device measuring the flow of fluid through a pipe based on the motion of particles suspended in the fluid, comprising:

(a) a narrow frequency light source;

(b) an optical delivery system that produces at least two parallel light beams within the interior of the pipe;

(c) a collection lens which focuses light scattered by the particles transiting said at least two parallel beams;

(d) a photo detector which converts scattered light focused by said collection lens into an electrical signal;

(e) a first optical fiber which couples said narrow frequency light source and said optical delivery system;

(f) a second optical fiber which couples said collection lens and said photo detector; and wherein said optical delivery system and said collection lens are mounted in a rigid plate, having a central hole therethrough, and the rigid plate is positioned so that fluid from the pipe passes through the central hole and wherein said optical delivery system and said collection lens are exposed to the interior of said pipe.

2. The device according to claim 1, wherein said narrow frequency light source is a laser.

3. The device according to claim 1, wherein said optical delivery system further comprises one or more of:
   (i) a collimator;
   (ii) a prism;
   (iii) a mirror; or
   (iv) a lens.

4. A process for determining the velocity of a fluid moving through a pipe comprising converting the electrical signals generated by the device according to claim 1 comprising:
   (a) digitizing each pulse of the detector output signal caused by collected light scattered from a particle passing through a light sheet exceeding a threshold above the ambient noise and determining its temporal centroid;
   (b) comparing the temporal centroid of each pulse that could have originated on the downstream sheet of light to the time of the pulses that could have occurred on the upstream beam in the recent past to obtain a possible transit time of a particle from one sheet of light to another;
   (c) converting each transit time to a transit velocity, by dividing the distance between the sheets by the transit time and recording the transit velocities in a corrologram;
   (d) identifying the peak in the corrologram generated over a finite time period by the large number of transit velocities clustered at a specific velocity; and
   (e) averaging transit velocities within that cluster in the corrologram.

5. A process according to claim 4 wherein the fluid is natural gas.

6. A device according to claim 1, in which five measurement locations are distributed across the pipe cross section with one at the pipe centerline, and four located 90° apart at a radius of 0.762 times the radius of the pipe, by using up to five sets of optical collectors and optical delivery systems.

7. A device according to claim 1 in which five measurement locations are distributed across the pipe cross section with one at the pipe centerline, and four located 90° apart at a radius of 0.762 times the radius of the pipe, by using at least one holographic optical element.

8. A device according to claim 1 in which five measurement locations are distributed across the pipe cross section with one at the pipe centerline, and four located 90° apart at a radius of 0.762 times the radius of the pipe, by using at least one manufactured diffractive optical element.

9. The device according to claim 1, wherein said rigid plate cooperates with and fits in a retainer slot of an orifice fitting comprising a body having an interior opening into the pipe and having a closable opening to receive said rigid plate.

10. An optical device for generating information to determine the flow rate of a fluid within a pipe comprising in cooperating arrangement:
   a. a rigid plate having a central hole therethrough, cooperating with and fitting in a retainer slot of an orifice meter body having an interior opening into the pipe and having a closable opening to receive said rigid plate, said rigid plate including;
      (i) at least one optical delivery system providing at least two parallel beams of light; and
      (ii) at least one collector receiving scattered light from said at least two parallel beams of light;
   b. a pressure seal adapted to fit in a port in said orifice meter body, through which communications cables pass; and
   c. at least one photo detector.

11. The device according to claim 10, wherein said optical delivery system comprises at least one laser.

12. The device according to claim 11, wherein the size and shape of said central hole in said rigid plate is approximately the internal size and shape of the cross section of said pipe.

13. The device according to claim 12, wherein said collector comprises a lens focusing the collected light on an output optical fiber.

14. The device according to claim 13, wherein said optical delivery system and said collector face said hole.

15. The device according to claim 14 wherein said at least one optical delivery system comprises in cooperating arrangement the output of said at least one laser, a collimator to produce at least one beam of light, and at least one lens.

16. The device according to claim 15, wherein said communications cables comprise at least one optical fiber which communicates with said at least one collector and said at least one photo detector.

17. The device according to claim 16, wherein said laser is directed into an input optical fiber which cooperates with said optical delivery system and said pressure seal.

18. The device according to claim 16, wherein said optical delivery system comprises a cylindrical lens.

19. The device according to claim 16, wherein said optical delivery system comprises a cylindrical lens wherein said cylindrical lens is at least a doublet having at least one internal curved surface, the first surface of the lens facing said light source shaped such that light strikes said first surface at a normal, the last surface of the lens facing the measurement volume defines a cylinder having an axis perpendicular to the flow direction and perpendicular to the direction of light propagation and passing through the measurement volume, the indices of refraction of the components of said cylindrical lens and curvature(s) of the internal curved surface(s) of the components of said lens being selected so that the light leaving said last surface is perpendicular to said last surface.

20. The device according to claim 18 wherein said at least one optical delivery system further comprises a beam splitter intermediate said collimator and said cylindrical lens to produce at least two beams of light.

21. The device according to claim 17, wherein said optical delivery system comprises a cylindrical lens.

22. The device according to claim 17, wherein said optical delivery system comprises a cylindrical lens wherein said cylindrical lens is at least a doublet having at least one internal curved surface, the first surface of the lens facing said light source shaped such that light strikes said first surface at a normal, the last surface of the lens facing the measurement volume defines a cylinder having an axis perpendicular to the flow direction and perpendicular to the direction of light propagation and passing through the measurement volume, the indices of refraction of the components of said cylindrical lens and curvature(s) of the internal curved surface(s) of the components of said lens being selected so that the light leaving said last surface is perpendicular to said last surface.

23. The device according to claim 21 wherein said at least one optical delivery system further comprises a beam splitter intermediate said collimator and said cylindrical lens to produce at least two beams of light.

24. The device according to claim 18, wherein the lens for said collector is at least a doublet having at least one internal curved surface, the surface of the lens facing the measurement volume defines a sphere having the measurement volume at its center, the surface of the lens facing the image defines a sphere having the image at its center, the indices of refraction of the components of said lens and curvatures of the internal curved surfaces of the components of said lens being selected so that the light from the measurement volume leaving the surface facing said collector is perpendicular to the lens surface facing the collector.

25. The device according to claim 19, wherein the lens for said collector is at least a doublet having at least one internal curved surface, the surface of the lens facing the measurement volume defines a sphere having the measurement volume at its center, the surface of the lens facing the image defines a sphere having the image at its center, the indices of refraction of the components of said lens and curvatures of the internal curved surfaces of the components of said lens being selected so that the light from the measurement volume leaving the surface facing said collector is perpendicular to the lens surface facing the collector.

26. The device according to claim 20, wherein the lens for said collector is at least a doublet having at least one internal curved surface, the surface of the lens facing the measurement volume defines a sphere having the measurement volume at its center, the surface of the lens facing the image defines a sphere having the image at its center, the indices of refraction of the components of said lens and curvatures of the internal curved surfaces of the components of said lens being selected so that the light from the measurement volume leaving the surface facing said collector is perpendicular to the lens surface facing the collector.

27. The device according to claim 21, wherein the lens for said collector is at least a doublet having at least one internal curved surface, the surface of the lens facing the measurement volume defines a sphere having the measurement volume at its center, the surface of the lens facing the image defines a sphere having the image at its center, the indices of refraction of the components of said lens and curvatures of the internal curved surfaces of the components of said lens being selected so that the light from the measurement volume leaving the surface facing said collector is perpendicular to the lens surface facing the collector.

28. The device according to claim 22, wherein the lens for said collector is at least a doublet having at least one internal curved surface, the surface of the lens facing the measurement volume defines a sphere having the measurement volume at its center, the surface of the lens facing the image defines a sphere having the image at its center, the indices of refraction of the components of said lens and curvatures of the internal curved surfaces of the components of said lens being selected so that the light from the measurement volume leaving the surface facing said collector is perpendicular to the lens surface facing the collector.

29. The device according to claim 23, wherein the lens for said collector is at least a doublet having at least one internal curved surface, the surface of the lens facing the measurement volume defines a sphere having the measurement volume at its center, the surface of the lens facing the image defines a sphere having the image at its center, the indices of refraction of the components of said lens and curvatures of the internal curved surfaces of the components of said lens being selected so that the light from the measurement volume leaving the surface facing said collector is perpendicular to the lens surface facing the collector.

30. A process for determining the velocity of a fluid moving through a pipe comprising converting the electrical signals generated by the device according to claim 10 comprising:

(a) digitizing each pulse of the detector output signal caused by collected light scattered from a particle passing through a light sheet exceeding a threshold above the ambient noise and determining its temporal centroid;

(b) comparing the temporal centroid of each pulse that could have originated on the downstream sheet of light to the time of the pulses that could have occurred on the upstream beam in the recent past to obtain a possible transit time of a particle from one sheet of light to another;

(c) converting each transit time to a transit velocity, by dividing the distance between the sheets by the transit time and recording the transit velocities in a corrologram;

(d) identifying the peak in the corrologram generated over a finite time period by the large number of transit velocities clustered at a specific velocity; and (e) averaging transit velocities within that cluster in the corrologram.

31. A process according to claim 30 wherein the fluid is natural gas.

32. A device according to claim 10, in which five measurement locations are distributed across the pipe cross section with one at the pipe centerline, and four located 90° apart at a radius of 0.762 times the radius of the pipe, by using up to five sets of optical collectors and optical delivery systems.

33. A device according to claim 10 in which five measurement locations are distributed across the pipe cross section with one at the pipe centerline, and four located 90° apart at a radius of 0.762 times the radius of the pipe, by using at least one holographic optical element.

34. A device according to claim 10 in which five measurement locations are distributed across the pipe cross section with one at the pipe centerline, and four located 90° apart at a radius of 0.762 times the radius of the pipe, by using at least one manufactured diffractive optical element.

35. An optical device that generates a signal which describes fluid flow on the basis of the motion of particles suspended in a fluid flowing through a pipe, said optical device, comprising:

(a) a narrow frequency light source;

(b) an optical delivery system exposed to the interior of the pipe that produces at least two parallel light beams within the interior of the pipe;

(c) a collector which receives light scattered by said particles from said at least two parallel beams; and (d) a photo detector coupled to said collector, said photo detector converting said scattered light received by said collector into an electrical signal;

wherein five measurement locations are distributed across the pipe cross section with one at the pipe centerline, and four located 90° apart at a radius of 0.762 times the radius of the pipe, by using up to five sets of optical collectors and optical delivery systems.

36. An optical device that generates a signal which describes fluid flow on the basis of the motion of particles suspended in a fluid flowing through a pipe, said optical device, comprising:

(a) a narrow frequency light source;

(b) an optical delivery system exposed to the interior of the pipe that produces at least two parallel light beams within the interior of the pipe;

(c) a collector which receives light scattered by said particles from said at least two parallel beams; and (d) a photo detector coupled to said collector said photo detector converting said scattered light received by said collector into an electrical signal;

wherein five measurement locations are distributed across the pipe cross section with one at the pipe centerline, and four located 90° apart at a radius of 0.762 times the radius of the pipe, by using at least one holographic optical element.

37. An optical device that generates a signal which describes fluid flow on the basis of the motion of particles suspended in a fluid flowing through a pipes said optical device comprising:

(b) a narrow frequency light source;

(b) an optical delivery system exposed to the interior of the pipe that produces at least two parallel light beams within the interior of the pipe;

(c) a collector which receives light scattered by said particles from said at least two parallel beams; and (e) a photo detector coupled to said collector, said photo detector converting said scattered light received by said collector into an electrical signal;

wherein five measurement locations are distributed across the pipe cross section with one at the pipe centerline, and four located 90° apart at a radius of 0.762 times the radius of the pipe, by using at least one manufactured diffractive optical element.

38. A process for determining the velocity of a fluid moving through a pipe from electrical pulses generated by an optical device that includes a narrow frequency light source, an optical delivery system that produces at least an upstream sheet of light and a downstream sheet of light within the pipe interior, a collector that receives light scattered by particles within the fluid, and a photo detector that converts the scattered light received by the collector into electrical pulses, comprising the acts of:

(a) digitizing each electrical pulse generated by the optical device caused by collected light scattered from a particle passing through a light sheet that exceeds a threshold above the ambient noise and determining the temporal centroid of the pulse;

(b) comparing the temporal centroid of each pulse that could have originated on the downstream sheet of light to the time of the pulses that could have occurred on the upstream sheet of light in the recent past to obtain a possible transit time of a particle from one sheet of light to another;

(c) converting each transit time to a transit velocity, by dividing the distance between the sheets by the transit time and recording the transit velocities in a corrologram;

(d) identifying the peak in the corrologram generated over a finite time period by the large number of transit velocities clustered at a specific velocity; and (e) averaging transit velocities within that cluster in the corrologram.

39. An optical flow meter that measures the flow rate of a fluid within a pipe comprising:

a. a plate installed between adjacent flanges of pipe, said plate including;
  (i) at least one optical delivery system mounted in said plate providing at least one beam of light inside said pipe; and
  (ii) at least one collection lens mounted in said plate receiving scattered light from said at least one beam of light;

b. a light source coupled to said optical delivery system; and c. at least one photo detector optically coupled to said collection lens.

40. An optical flow meter as in claim 39, wherein said plate further includes a first fiber optic cable partially mounted in said plate that couples to said optical delivery system, and a second fiber optic cable partially mounted in said plate that couples said collection lens to said photo detector.

41. An optical flow meter as in claim 39, wherein said optical delivery system produces at least two parallel beams of light and includes a mirror and a lens, and wherein said lens is directly exposed to the interior of said pipe.

42. An optical flow meter as in claim 39, wherein said optical delivery system includes a mirror and a prism.

43. An optical flow meter as in claim 39, wherein said optical delivery system includes a prism and a lens.

44. An optical flow meter as in claim 39, wherein said plate has a central hole with a diameter approximately equal to the inside diameter of the pipe, and said optical delivery system and said collection lens mount in said plate with direct optical access to the interior of said pipe.

45. An optical device, capable of being at least partially mounted in a plate, said optical device measuring the flow of fluid through a pipe based on the motion of particles suspended in the fluid, comprising:

(a) a narrow frequency light source;

(b) an optical delivery system that produces at least two parallel light beams within the interior of the pipe;

(c) a collection lens which focuses light scattered by said particles from said at least two parallel beams;

(d) a photo detector which converts the scattered light focused by said collection lens into an electrical signal;

(e) a first optical fiber which couples said narrow frequency light source to said optical delivery system;

(f) a second fiber optic which couples said collection lens to said photo detector; and wherein said plate includes a central hole through which the fluid flows, and said optical delivery system and said collection lens are mounted in said plate with direct optical access to the fluid flowing through the central hole of said plate.

* * * * *